United States Patent

Ginzel et al.

[11] Patent Number: 5,983,866
[45] Date of Patent: Nov. 16, 1999

[54] DIAGNOSTIC APPARATUS AND METHOD FOR A COMBUSTION SENSOR FEEDBACK SYSTEM

[75] Inventors: Geoffrey D. Ginzel, Lafayette, Ind.; George W. Mattson, Lacon, Ill.

[73] Assignee: Caterpillar Inc., Peoria, Ill.

[21] Appl. No.: 08/957,836

[22] Filed: Oct. 27, 1997

[51] Int. Cl.[6] .................................................. F02P 5/14
[52] U.S. Cl. .......................................... 123/481; 73/117.3
[58] Field of Search .................................. 123/481, 435, 123/676; 73/115, 116, 117.3

[56] References Cited

U.S. PATENT DOCUMENTS

| | | | |
|---|---|---|---|
| 4,433,654 | 2/1984 | Yokooku | 123/435 |
| 4,903,665 | 2/1990 | Washino et al. | 123/435 |
| 4,971,010 | 11/1990 | Iwata | 123/435 |
| 5,036,669 | 8/1991 | Earleson et al. | 60/602 |
| 5,050,551 | 9/1991 | Morikawa | 123/676 |
| 5,062,294 | 11/1991 | Iwata | 73/115 |
| 5,129,228 | 7/1992 | Kondo | 60/274 |

FOREIGN PATENT DOCUMENTS 0412578  2/1991  European Pat. Off. ........ F02D 41/14

*Primary Examiner*—Willis R. Wolfe
*Assistant Examiner*—Hieu T. Vo

[57] ABSTRACT

An apparatus for determining if a combustion condition in a combustion chamber of an internal combustion engine occurred includes a combustion sensor for sensing the occurrence of the combustion condition in the combustion chamber and producing a combustion signal responsive to the combustion condition, a temperature sensor for sensing a temperature condition in an exhaust passage from the combustion chamber and producing a temperature signal having a characteristic indicative of the sensed temperature condition, and a controller connected for receiving the combustion signal and the temperature signal and operable in the absence of receipt of an expected combustion signal to determine if the combustion condition occurred by comparing the temperature signal characteristic with a predetermined characteristic value indicative of the occurrence of the combustion condition in the combustion chamber.

12 Claims, 2 Drawing Sheets

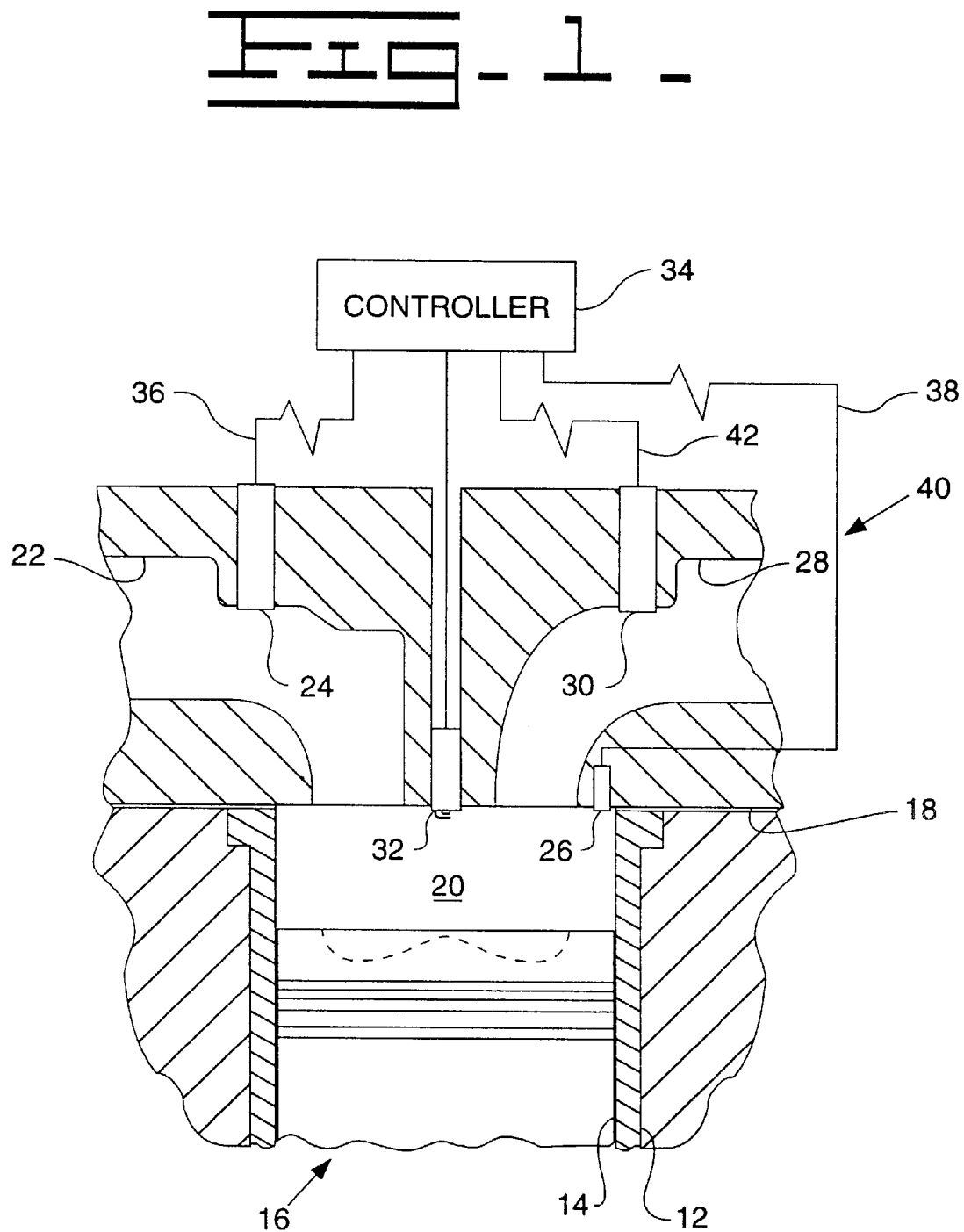

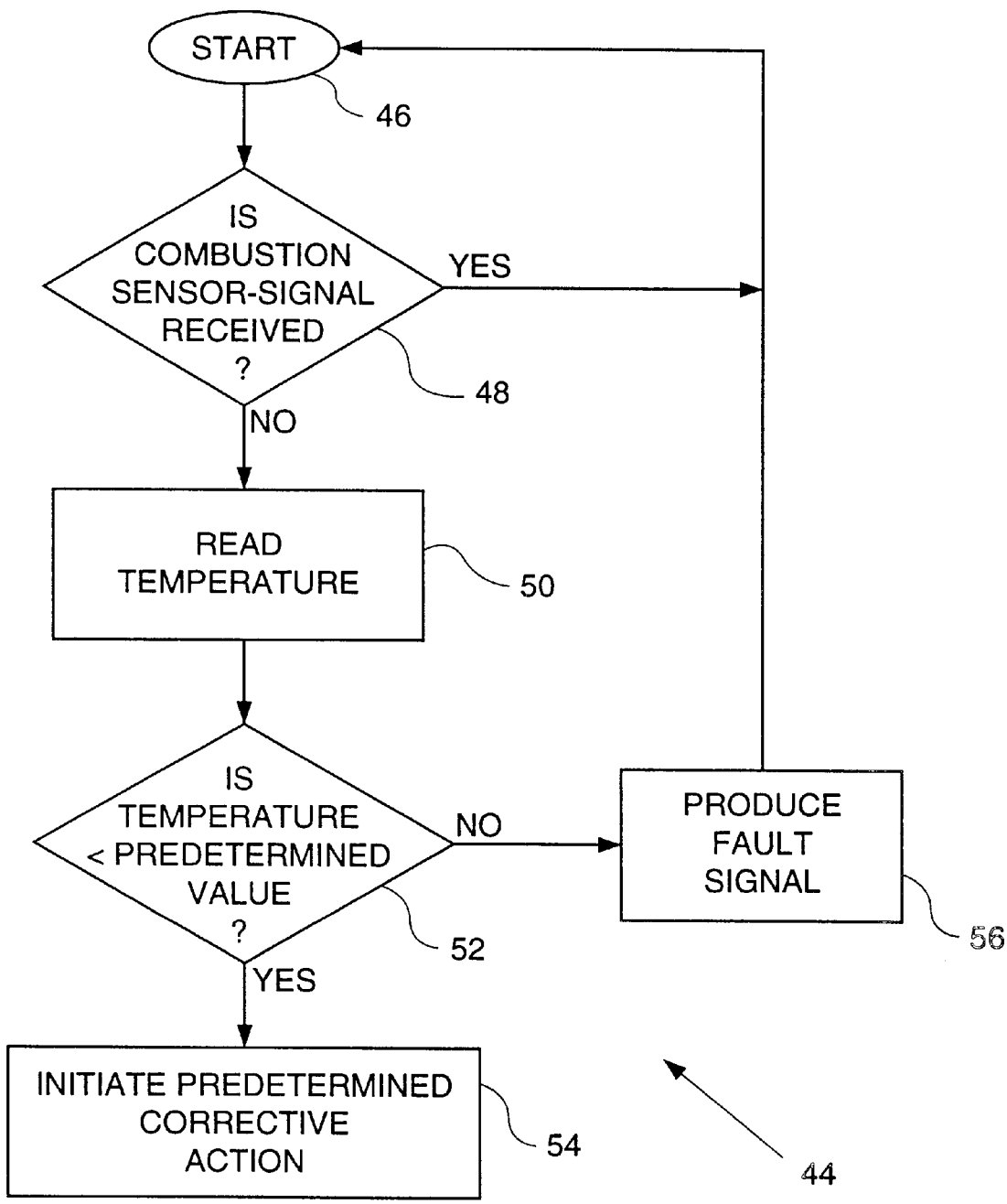

DIAGNOSTIC APPARATUS AND METHOD FOR A COMBUSTION SENSOR FEEDBACK SYSTEM

TECHNICAL FIELD

This invention relates generally to a diagnostic apparatus and method for a combustion sensor feedback system of an internal combustion engine and more particularly, to an apparatus and method for determining if the combustion sensor feedback system is operating.

BACKGROUND ART

Currently, in many internal combustion engines an electronic controller is used to control the air fuel mixture delivered to a combustion chamber of a cylinder of the engine, and to produce a timed ignition signal in response to sensed engine parameters to ignite the mixture in engines that are spark ignited. Generally, in a spark ignited engine, the ignition signal is delivered to a spark plug which is disposed centrally in the combustion chamber, and a flame is produced when the spark ignites the air fuel mixture.

A combustion sensor, which can be an ion probe, optical device, thermocouple, or like device, is typically also located in the combustion chamber. Examples of conventional combustion sensors and systems are shown in Earleson et al., U.S. Pat. No. 5,036,669, issued Aug. 6, 1991; Maddock et al., U.S. Pat. No. 5,041,980, issued Aug. 20, 1991; McCombie, U.S. Pat. No. 5,392,641, issued Feb. 28, 1995; and Wood, UK patent application GB 2282221, published Mar. 29, 1995. In operation, a combustion sensor typically produces a combustion signal in response to the presence of a predetermined combustion condition in the combustion chamber, such as, in the case of an ion probe, the flame propagating past the ion probe. If the flame is not detected by the combustion sensor, a combustion signal is not produced or delivered to the electronic controller. In the absence of the combustion signal, the electronic controller determines that the cylinder is "dead", that is, for some reason or another the combustion condition is not occurring in the combustion chamber. The electronic controller will then proceed to cutout the affected cylinder, typically by terminating fuel delivery to the cylinder.

A problem that can occur, however, is that the electronic controller can cutout a cylinder because no combustion signal is received from the combustion sensor for that cylinder, even when combustion is actually occurring in the cylinder, because there is a problem with the combustion sensor feedback system.

Accordingly, the present invention is directed to overcoming one or more of the problems as set forth above.

DISCLOSURE OF THE INVENTION

In one aspect of the present invention, apparatus for determining if a combustion condition in a combustion chamber of an internal combustion engine occurred is disclosed, which apparatus includes a combustion sensor for sensing the occurrence of the combustion condition in the combustion chamber and producing a combustion signal responsive to the combustion condition, a temperature sensor for sensing a temperature condition in an exhaust passage from the combustion chamber and producing a temperature signal having a characteristic indicative of the sensed temperature condition, and a controller connected for receiving the combustion signal and the temperature signal and operable in the absence of receipt of an expected combustion signal to determine if the combustion condition occurred by comparing the temperature signal characteristic with a predetermined characteristic value indicative of the occurrence of the combustion condition in the combustion chamber.

When it is determined that the combustion condition has not occurred from comparison of the temperature signal characteristic with the predetermined characteristic value, the controller can shut down the engine, or in cases where appropriate fuel delivery apparatus exists, such as in fuel-injected engines, the controller can be operable in association with the fuel delivery apparatus to terminate fuel delivery to the affected combustion chamber to cutout that cylinder. Likewise, the controller can be optionally operable to produce a signal indicating a dead cylinder when a determination is made that the combustion condition has not occurred. In turn, a dead cylinder indicator or flag can be stored in memory located in or external to the controller, and/or broadcast to an operator display device or service tool.

According to another aspect of the present invention, in the absence of receipt of an expected combustion signal, the controller is operable to produce a signal indicative of a dead cylinder if, on the one hand, the temperature signal characteristic is less than the predetermined characteristic value, and the controller is operable to produce a signal indicative of a combustion sensor related fault condition if, on the other hand, the temperature signal characteristic is greater than or equal to the predetermined characteristic value. Here, sensed exhaust temperatures greater than or equal to a predetermined value are indicative of the occurrence of combustion in the combustion chamber, and thus and indication that there is a combustion sensor fault condition if the expected combustion signal was not received. Sensed exhaust temperatures less than the predetermined value are indicative of the absence of combustion and thus a dead cylinder, verifying that the absence of receipt of the expected combustion signal was correct.

The present invention is operable with a wide variety of combustion sensor feedback systems, including those utilizing a probe capable of sensing a flame in the combustion chamber, such as an ion probe, as well as sensor devices such as an optical detector or a thermocouple, to name just a few alternatives. Similarly, various devices for sensing the exhaust temperature from the combustion chamber can be utilized, including a thermocouple capable of producing a temperature signal having a variable voltage level characteristic, which voltage level varies according to the temperature of exhaust gases exhausted from the combustion chamber or another exhaust region wherein the temperature will be indicative of whether combustion occurred in the subject combustion chamber. In any event, the temperature signal produced will have some threshold characteristic for determining when combustion has occurred in a particular cylinder which can be utilized for the purposes of the present invention.

BRIEF DESCRIPTION OF DRAWINGS

For a better understanding of the present invention, reference may be made to the accompanying drawings in which:

FIG. 1 is a fragmentary cross-sectional view of a typical cylinder of an internal combustion engine including apparatus according to the present invention; and FIG. 2 is a high level flow diagram showing operation of the apparatus of FIG. 1 according to the present invention.

BEST MODE FOR CARRYING OUT THE INVENTION

Referring now to the drawings, wherein a preferred embodiment of the present invention is shown, FIG. 1 identifies a typical internal combustion engine 10 including a tubular cylinder liner 12 which forms a cylinder 14. Engine 10 is representative of a wide variety of internal combustion engines including both single cylinder engines and multiple cylinder engines which use a wide variety of fuels including, gasoline, diesel fuel, alcohols, and methane, to name just a few types of engines with which the present invention is usable. Cylinder 14 of engine 10 contains a piston 16 reciprocally movable therein in the usual manner, in connection with a crankshaft of the engine (not shown). Engine 10 further includes a head 18 enclosing one end of cylinder 14 to form a combustion chamber 20.

Head 18 of engine 10 includes an intake port 22 extending therethrough in communication with combustion chamber 20 for the passage of air and fuel into the combustion chamber 20, have fuel being delivered into air flow through intake port 22 by a fuel injector 24 mounted in head 18 in communication with intake port 22, it being likewise recognized that fuel could also be delivered into the air flow upstream of the intake port 22 using a conventional carburetor or the like (not shown). Head 18 further includes a conventional combustion sensor 26 which is an ion probe mounted in communication with combustion chamber 20. Also, head 18 includes an exhaust port 28 in communication with the combustion chamber for the passage of exhaust gases and other products of combustion, and an exhaust temperature sensor 30 which is a thermocouple mounted in communication with exhaust port 28 for sensing the temperature of exhaust gases exhausted from combustion chamber 20 after combustion has occurred therein. Exhaust temperature sensor 30 is operable to produce a variable temperature signal corresponding to sensed temperature conditions, in the usual manner. A spark plug 32 is also located in combustion chamber 20.

Engine 10 includes a controller 34 for controlling the air fuel mixture delivered to combustion chamber 20 as well as other engine operating parameters based at least in part on certain sensed engine parameters. Controller 34 communicates with fuel injector 24 via path 36 and controller 34 receives combustion signals from combustion sensor 26 via path 38. The combustion sensor 26 and path 38 generally comprise the elements of a combustion sensor feedback system 40 for combustion chamber 20. Also similarly, path 42 extends between controller 34 and exhaust temperature sensor 30, for communication of exhaust temperature signals to the controller from the exhaust temperature sensor 30. Paths 36, 38, and 42 may be of conventional construction including one or more lengths of wire and/or connectors as is well known.

Under normal conditions, controller 34 operates to read the combustion signals received via path 38 of combustion sensor feedback system 40 to determine combustion conditions in combustion chamber 20. In this regard, the combustion signal from an ion probe combustion sensor 26 is a DC voltage signal, the voltage level of which is indicative of the combustion condition in combustion chamber 20 and the timing of which is indicative of flame propagation speed. When no combustion is present in combustion chamber 20, combustion sensor 26 sends no combustion signal. Controller 34 determines the occurrence and quality of combustion conditions in combustion chamber 20 based at least in part on the combustion signal, and the absence of a combustion signal indicates to controller 34 that combustion is not present in combustion chamber 20. Previously, a controller, in the absence of receipt of an expected combustion signal from a particular combustion sensor, would determine that the subject cylinder is a dead cylinder and shut off the engine or, where possible, terminate fuel delivery to that cylinder. A problem that arose is that when there was a problem with the combustion sensor and/or another part of the combustion sensor feedback system, such that no combustion sensor signal was received by the controller, even though combustion was occurring, the controller would determine that no combustion was occurring for that cylinder and treat the cylinder as a dead cylinder.

To avoid the above discussed problem, controller 34, according to the present invention, in the absence of receipt of an expected combustion signal from combustion sensor feedback system 40, is operable to read the exhaust temperature signal received on path 42 to determine if a temperature condition indicative of combustion in the affected cylinder is present. If so, fuel and spark delivery to the cylinder is continued. If not, the engine may be shut down, or, where possible, fuel delivery to the affected cylinder may be terminated. Still further, the controller can optionally produce a diagnostic signal indicative of the problem and store an indicator in memory, and/or broadcast it to an operator display device or service tool (not shown).

FIG. 2 shows a high level flow diagram 44 illustrating the operation of controller 34 for determining whether combustion is occurring and whether the combustion sensor feedback system 40 is operating. Referring to diagram 44, after initiation of the determination process represented by the start block 46, controller 34 makes a determination of whether a combustion sensor signal is received as shown by decision block 48. If the combustion sensor signal is received, no further steps are taken until the routine is again initiated. If no combustion sensor signal is received, controller 34 will read the exhaust temperature signal on wire 42 as shown by block 50. Then, as shown by decision block 52, controller 34 compares the exhaust temperature to a predetermined value above which combustion is present in the subject cylinder, and below which combustion is not present, which predetermined value is determinable for a given engine type through testing. This comparison is typically made by comparing a characteristic of the temperature signal, such as voltage level, with a predetermined characteristic value which may be incorporated into controller programming or memory. If the exhaust temperature is below the predetermined value, the absence of combustion as indicated by the absence of the expected combustion signal is verified and controller 34 is then operable to initiate some predetermined corrective action such as shutting down the engine, or, where possible, terminating fuel delivery to combustion chamber 20, as shown by a block 54. If, on the other hand, the exhaust temperature is not less than the predetermined value, the controller 34 determines that there is a fault in combustion sensor feedback system 40, and produces a fault signal as shown by block 56. Further, if it is determined that there is a combustion sensor feedback system fault, controller 34 can operate accordingly to continue fuel delivery to the affected cylinder. Additionally, as also noted above, when a fault condition in a combustion sensor feedback system 40 is detected, the fault signal can be stored in memory either contained in the controller itself or external thereto, supplied to a service tool, and/or broadcast to an operator display, such that the fault can be more accurately and rapidly diagnosed and corrected. Similarly, if a dead cylinder or other problem is detected, a fault signal for that condition can be produced, stored, and/or broadcasted in the same manner.

Industrial Applicability

The present diagnostic apparatus and method for determining if a combustion sensor feedback system is operating has applicability for a wide variety of internal combustion engine applications, including vehicular applications, as well as industrial, gas compression, electric power generation, and co-generation applications using a wide variety of fuels. Operational objects for all such engines include high output, low emissions, high thermal efficiency, and precise control of engine operating parameters. The present diagnostic apparatus and method help achieve these objects by enabling an electronic engine controller to quickly and simply ascertain whether there is a combustion problem or whether there is a problem with the combustion sensor feedback system, and operate accordingly, including avoiding needlessly terminating combustion in the cylinder. This results in improved overall engine operation without significant added costs or complexity.

Other aspects, objects and advantages of the present invention can be obtained from a study of the drawings, the disclosure and the appended claims.

We claim:

1. A combustion monitoring system of a combustion chamber of an internal combustion engine, comprising:
    a combustion sensor for sensing the occurrence of a combustion condition in the combustion chamber and producing a combustion signal responsive to the combustion condition;
    an exhaust temperature sensor for sensing a temperature condition in an exhaust passage from the combustion chamber and producing a temperature signal having a characteristic indicative of the sensed exhaust temperature; and
    a controller connected for receiving the combustion signal and the temperature signal and operable, in the absence of receipt of an expected combustion signal, to produce a signal indicative of a combustion problem if the temperature signal characteristic is less than a predetermined characteristic value, and to produce a signal indicative of a combustion sensor related fault condition if the temperature signal characteristic is greater than the predetermined characteristic value.

2. The combustion monitoring system, as set forth in claim 1, wherein the engine includes apparatus for delivering fuel to the combustion chamber and the controller is operable to cause fuel delivery to the combustion chamber to terminate only if both the expected combustion signal is not received and the temperature signal characteristic is less than the predetermined characteristic value.

3. The combustion monitoring system, as set forth in claim 1, wherein the controller is operable to shut down the engine only if both the expected combustion signal is not received and the temperature signal characteristic is less than the predetermined characteristic value.

4. An apparatus for determining if a combustion condition in a combustion chamber of an internal combustion engine occurred, comprising:
    a combustion sensor for sensing the occurrence of the combustion condition in the combustion chamber and producing a combustion signal responsive to the combustion condition;
    a temperature sensor for sensing a temperature condition in an exhaust passage from the combustion chamber and producing a temperature signal having a characteristic indicative of the sensed temperature condition; and
    a controller connected for receiving the combustion signal and the temperature signal and operable in the absence of receipt of an expected combustion signal to determine if the combustion condition occurred by comparing the temperature signal characteristic with a predetermined characteristic value, wherein, if the temperature signal characteristic is greater than the predetermined characteristic value, a determination is made that the combustion condition did occur, and the controller is operable to produce a signal indicating a combustion sensor related fault condition if both the expected combustion signal was not received and the determination is made that the combustion condition did occur.

5. The apparatus, as set forth in claim 4, wherein, if the temperature signal characteristic is less than the predetermined characteristic value, a determination is made that the combustion condition did not occur.

6. The apparatus, as set forth in claim 5, wherein the engine includes apparatus for delivering fuel to the combustion chamber, and wherein the controller is operable in association with the fuel delivery apparatus to terminate fuel delivery to the combustion chamber when the determination is made that the combustion condition did not occur.

7. The apparatus, as set forth in claim 6, wherein the controller is operable to produce a signal indicating a dead cylinder when the determination is made that the combustion condition did not occur.

8. The apparatus, as set forth in claim 4, wherein the combustion sensor comprises an ion probe.

9. The apparatus, as set forth in claim 4, wherein the combustion sensor comprises an optical detector.

10. The apparatus, as set forth in claim 4, wherein the temperature sensor comprises a thermocouple.

11. A method of determining whether an expected combustion condition occurred in a combustion chamber of an internal combustion engine including a combustion sensor disposed in the combustion chamber, the method comprising the steps of;
    (a) determining whether an expected combustion signal was produced by the combustion sensor;
    (b) determining whether temperature of exhaust from the combustion chamber is less than a predetermined temperature;
    (c) determining that the expected combustion condition did not occur if:
        (I) a determination is made in step (a) that the combustion signal was not produced; and
        (ii) a determination is made in step (b) that the temperature of the exhaust is less than the predetermined temperature; and
    (d) determining that a combustion sensor fault condition exist if:
        (I) a determination is made in step (a) that the combustion signal was not produced; and
        (ii) a determination is made in step (b) that the temperature of the exhaust is greater than the predetermined temperature.

12. The method, as set forth in claim 11, comprising the further step of:
    (d) initiating a predetermined corrective action if the determination is made that the expected combustion condition did not occur.

* * * * *